July 17, 1934.   P. M. MILLER   1,966,823
MOTOR TRUCK WHEEL
Filed Aug. 20, 1929   4 Sheets-Sheet 1
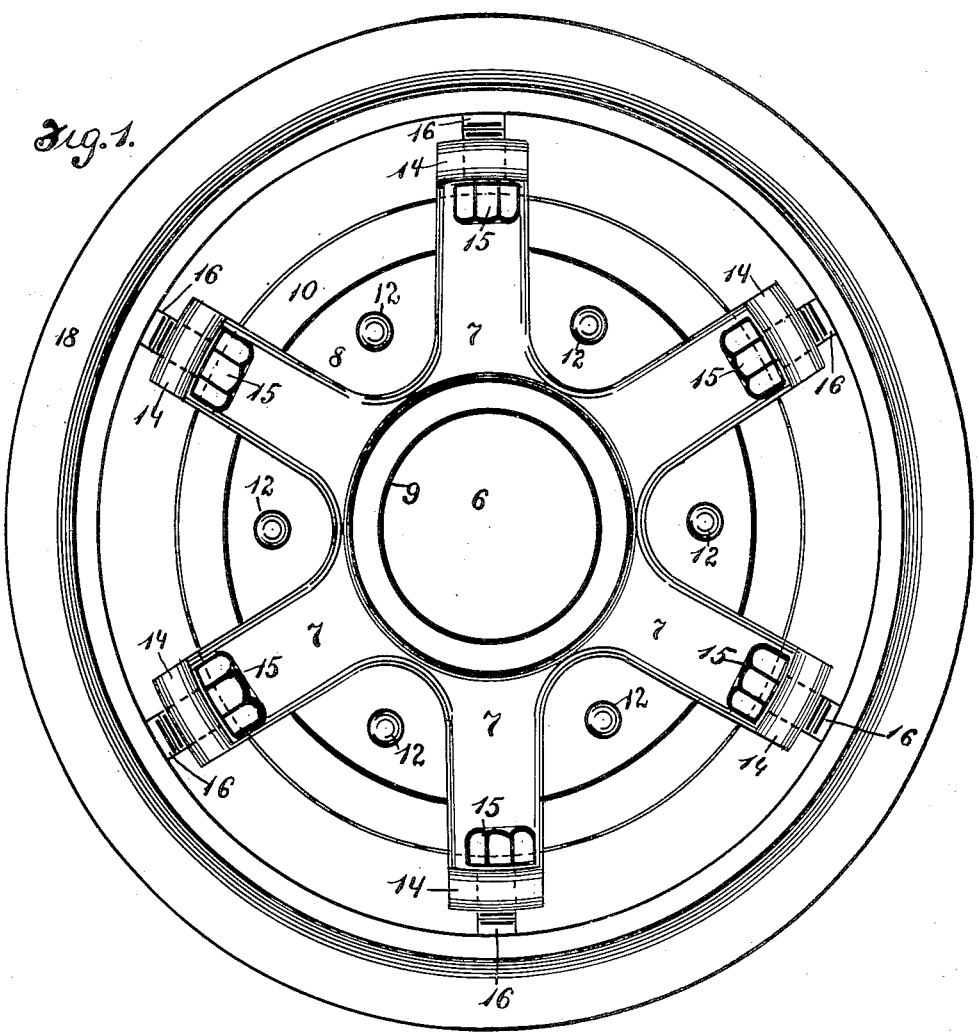
INVENTOR.
Philip M. Miller July 17, 1934.  P. M. MILLER  1,966,823
MOTOR TRUCK WHEEL
Filed Aug. 20, 1929  4 Sheets-Sheet 2
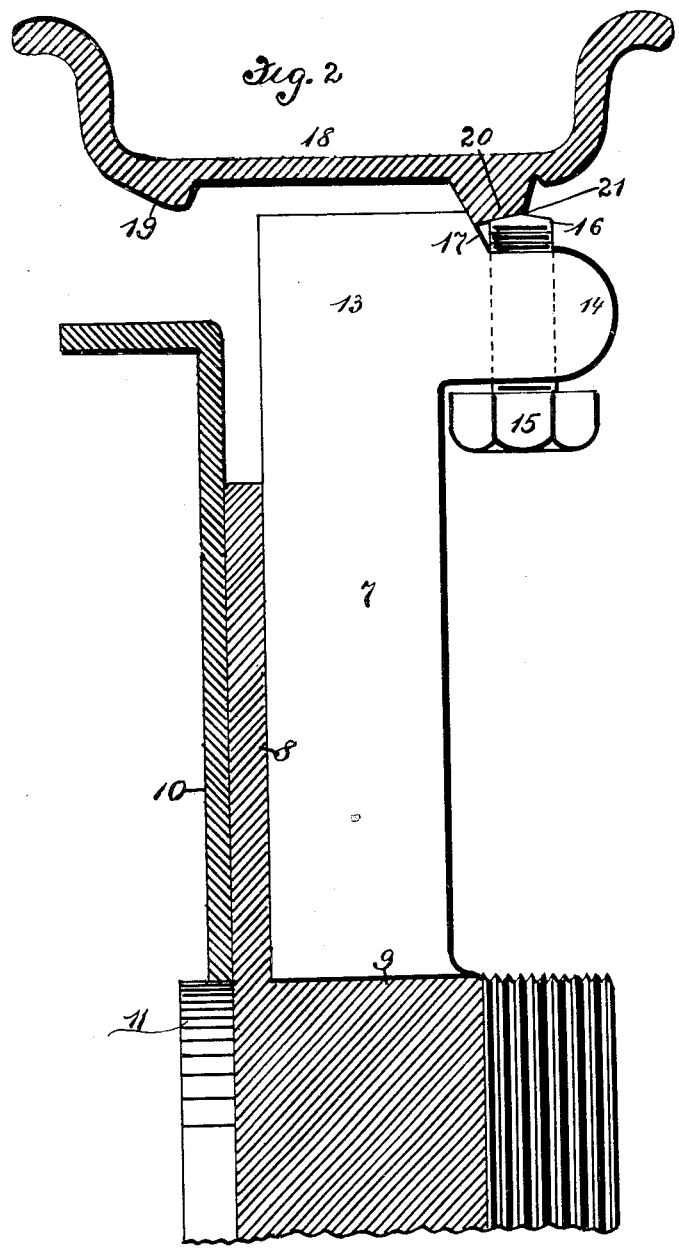
INVENTOR.
Philip M. Miller

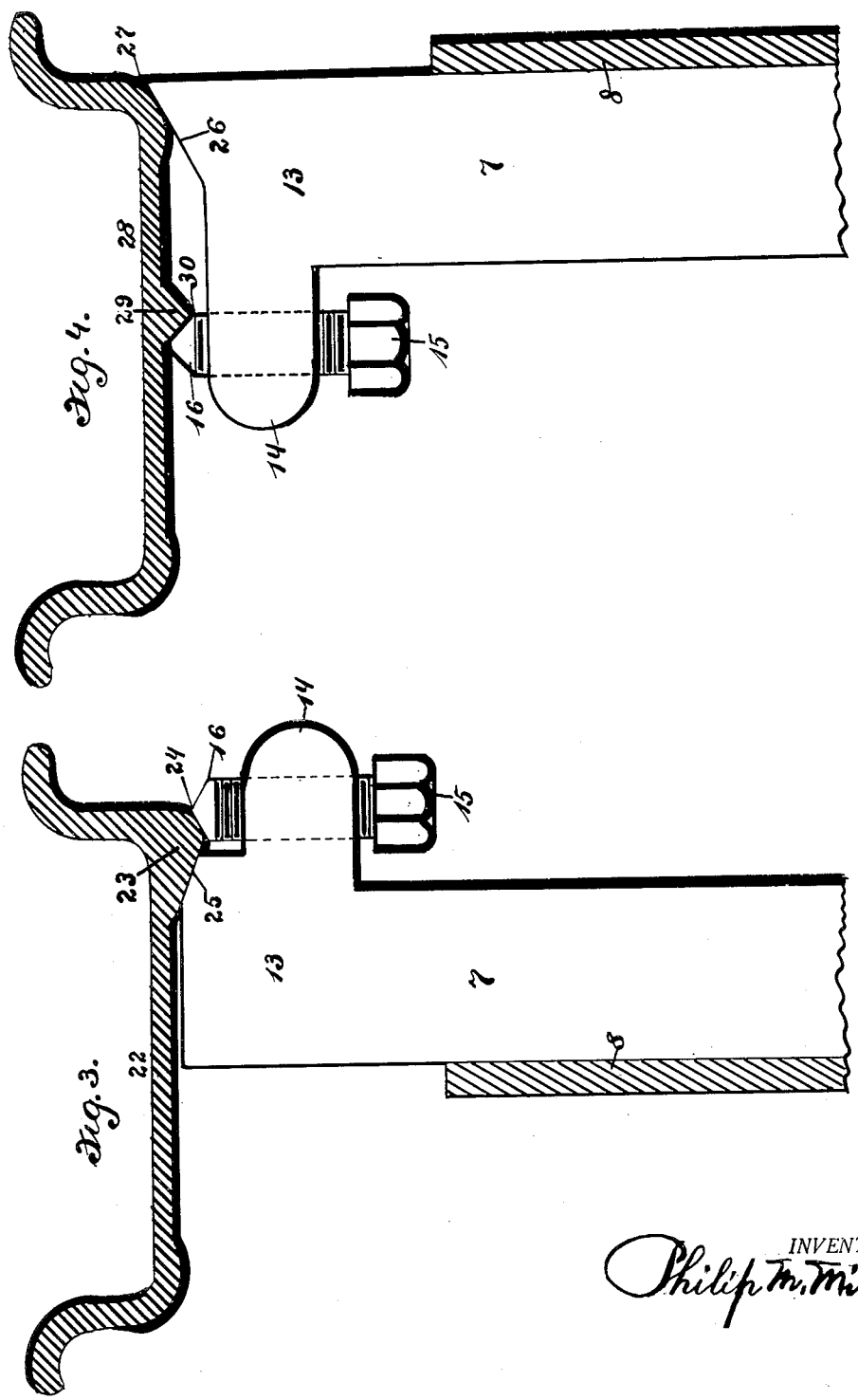

July 17, 1934.   P. M. MILLER   1,966,823
MOTOR TRUCK WHEEL
Filed Aug. 20, 192   4 Sheets-Sheet 4
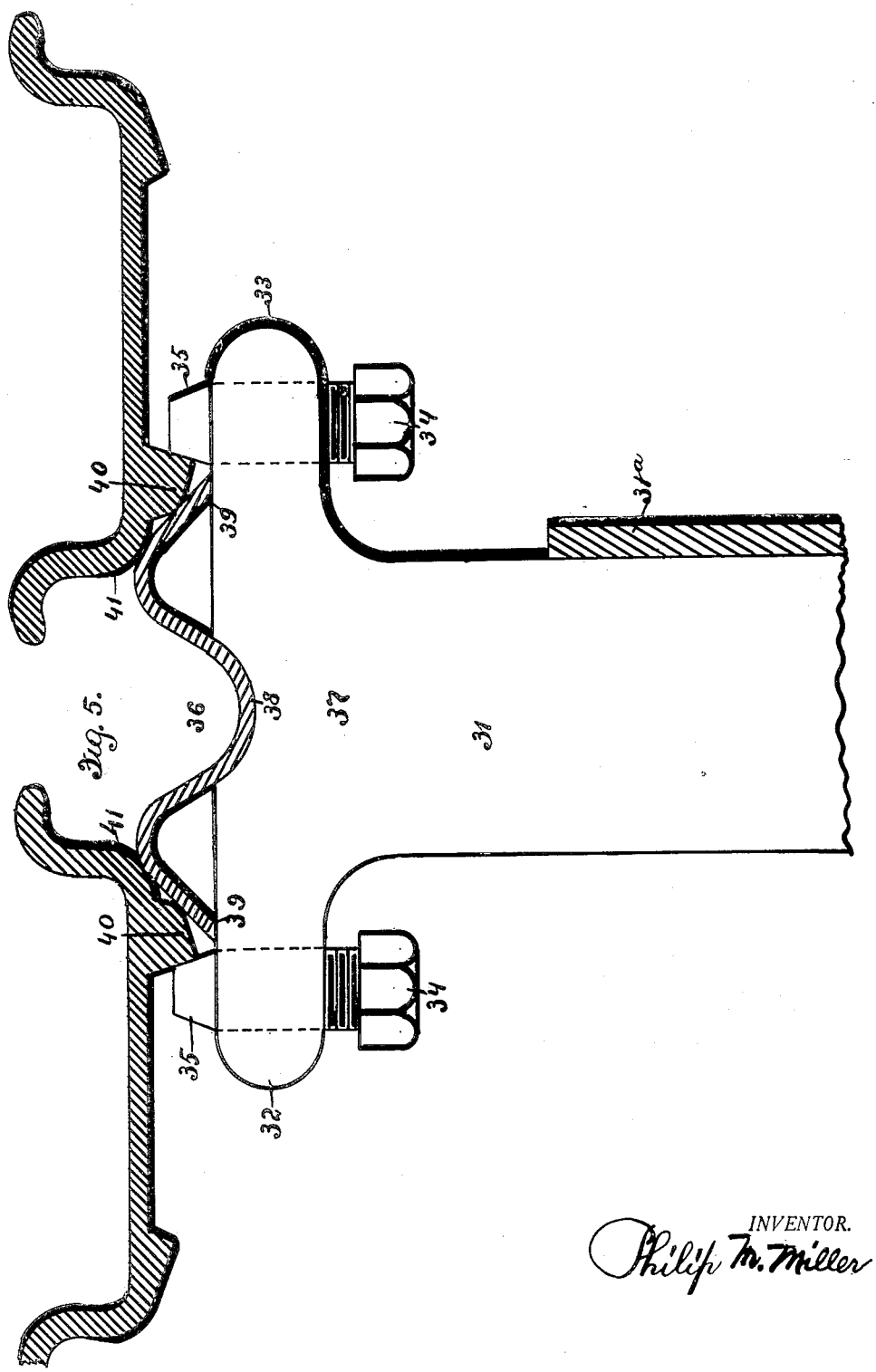
INVENTOR.
Philip M. Miller Patented July 17, 1934

1,966,823

UNITED STATES PATENT OFFICE 1,966,823

MOTOR TRUCK WHEEL

Philip M. Miller, Youngstown, Ohio, assignor to Miller Devices Inc., New York, N. Y., a corporation of New York Application August 20, 1929, Serial No. 387,198

4 Claims. (Cl. 301—12)

This invention relates to wheels for motor vehicles and particularly motor vehicles of the heavy duty type such as trucks and the like.

The primary object of the invention is to provide a simple economical and convenient means for mounting tire rims on spider members of the type having free spoke ends, and which means will not necessarily become detached or separated from the spoke ends when the tire is removed.

Another object of the invention is to provide a rim mounting means of extremely simple construction and design which is adapted for both single and dual tire wheels and which will also permit the mounting of dual rims upon a single tire wheel.

The foregoing and other objects and advantages will become apparent in view of the following description taken in conjunction with the drawings, wherein:

Figure 1 is a view in side elevation of a wheel constructed in accordance with the features of my invention;

Fig. 2 is a cross sectional view of a portion of the wheel;

Figs. 3 and 4 are views similar to Fig. 2, showing modifications in structure;

Fig. 5 is a cross section of a dual tire wheel, showing the preferred type of rim mount as applied to such wheels.

The wheel which I have adopted for the purpose of illustrating the invention comprises a spider member having a central hub opening 6, spokes 7 and a reinforcing wall 8, the said spokes and wall having formed integrally therewith a hub 9. A brake drum 10 is mounted on a shoulder 11 formed at the inboard extremity of the hub 9 and is secured to the wall 8 by rivets 12.

The outer extremities 13 of the spokes 7 are each formed with integral lateral outboard projections or bosses 14 which are provided with radially threaded openings for receiving a locking bolt 15. The outer end of the bolt is provided with a conical bearing 16 adapted to engage the mounting bead of a tire rim.

In the form shown in Fig. 2, the spoke end is provided with a beveled bearing surface or means 17. This bearing surface in Fig. 3 is indicated at 25 and in Fig. 4 at 26, the angle of the beveled bearing surface varying in the respective views for the purpose of accommodating varying types of tire rims as shown. The rim indicated at 18 in Fig. 2 is of the type known in the market as the "Firestone standard B" type and is provided with a bead 19 and a mounting bead 20, the latter bead being adapted to engage the conical bearing end 16 of the locking bolt 15. The mounting of the rim is such that the load is transmitted in a substantially straight line through the spoke 7 to the hub of the wheel.

The operation is relatively simple, it only being necessary to retract the locking bolt 15 radially to clear the bead 20 in demounting the rim, and to thread the bolt radially outwardly in mounting the rim and set up a wedging engagement between the conical bearing end 16 of the bolt and the bearing surface 21 of the bead 20.

In Fig. 3, the rim 22 is what is known in the market as the "Firestone D" type rim and is provided with a mounting bead 23, the conical end 16 of the locking bolt 15 bearing against said bead at 24. When the rim is locked in position on the spoke end, the bead 23 is wedged into engagement with the bearing surface 25.

The rim 28 in Fig. 4 is provided with a bead 29 at an intermediate portion thereof, the inboard side of the rim being provided with a bearing portion 27 which is wedged into engagement with the surface 26 when the end 16 of the locking bolt 15 is moved into engagement with the bearing surface 30 of the bead 29. It will be noted that in this construction, the rim bears on the spoke end at two spaced points, a type of mounting which is desirable in certain heavy duty wheels.

Referring to Fig. 5, the spoke of the spider member is indicated at 31 and in this instance the wheel is of the duel type. Accordingly, the spoke end is provided with oppositely disposed projections or bosses 32 and 33 adapted to receive locking bolts 34 each having a conical bearing end 35. The reinforcing wall for the spokes is indicated at 31a.

To hold the rim separate a transversely split spacer 36 is provided having a central inrolled portion 38 which engages in a recess formed in the end portion 37 of the spoke. The opposite sides of the spacer are provided with inclined bearing portions 39 adapted to engage the inboard side of a mounting bead 40 provided on each of the tire rims and to also bear against the surface of the rim at 41. In demounting the rims, the locking bolts 34 are retracted, the outer rim removed, the spacer next removed from the wheel, thus permitting the inboard rim to be demounted from the outboard side of the wheel.

From the foregoing, it will be seen that I have provided a wheel particularly adapted for heavy duty service which embodies a rim mounting construction of marked simplicity both in structure and operation, yet at the same time is rugged and capable of withstanding the stresses to which wheels of this type are normally subjected.

It will be understood that certain minor changes and modifications in structure may be adopted within the scope of the invention as defined by the appended claims.

Having thus described my invention, what I desire to secure by Letters Patent is:

1. In combination with a demountable tire rim having a mounting bead on the one side thereof, a spider member having free spoke ends provided with outstanding integral lateral projections and a beveled bearing means adapted to wedgingly engage one side of said bead, said projections being formed with interiorly threaded bores extending in a plane substantially normal to the axis of the spider member, and locking bolts threaded through said bores and formed with conical ends adapted to be moved radially outwardly and inwardly into and from wedging engagement with the opposite side of said bead whereby the rim is moved into and released from locking engagement with respect to the spoke ends of the spider member 2. A dual tire wheel for motor vehicles comprising, in combination with a pair of demountable rims having mounting beads on the adjacent edge portions thereof, a spider member having free spoke ends formed with spacer seats in their peripheral surfaces and lateral projections on opposite sides thereof, said projections being formed with threaded bores extending in a substantially radial direction, rim-spacing means adapted to be positioned in said seats to maintain said rims in spaced relation, and radially acting locking elements threaded through said bores with their ends in wedging engagement with said beads whereby the rims are releasably held in wedging engagement with said spacing means.

3. A dual tire wheel for motor vehicles comprising, in combination with a pair of demountable rims having mounting beads on the adjacent edge portions thereof, a spider member having free spoke ends formed with depressions in the peripheral surfaces thereof, which constitute spacer seats, and lateral projections on each side of the spoke ends, an annular split spacer member mounted in said seats, said projections being bored and threaded in a radial direction, and locking bolts in said bores, said bolts having tapered ends adapted to engage the beads of said rims when the bolts are screwed radially outwardly and force the rims into wedging engagement with the sides of said spacer ring, said rims and spacer member being released and removed laterally outwardly by retracting the outboard locking bolt.

4. A wheel spider construction comprising a spider member having free spoke ends formed with integral lateral outboard projections and peripheral inclined bearing means for wedging engagement with a tire rim, a demountable rim having an outboard side inclined bearing portion, said rim being mounted on the free spoke ends and having the inclined bearing portion thereof engaged with the inclined bearing means of the spoke ends, and locking bolts threaded through the projections of the spoke ends and having conical ends adapted to be advanced or retracted in a substantially radial direction into direct locking or unlocking engagement with the outboard face of the inclined bearing portion of the rim, said bolts when advanced being adapted to move the rim laterally into wedging contact with the inclined bearing means of the spider member and when retracted permitting the rim to be removed laterally therefrom.

PHILIP M. MILLER.